United States Patent
Foster

(10) Patent No.: US 6,305,218 B1
(45) Date of Patent: Oct. 23, 2001

(54) METHOD OF AND APPARATUS FOR USING AN ALTERNATE PRESSURE TO MEASURE MACH NUMBER AT HIGH PROBE ANGLES OF ATTACK

(75) Inventor: Roger D. Foster, Burnsville, MN (US)

(73) Assignee: Rosemount Aerospace Inc., Burnsville, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,173

(22) Filed: Feb. 22, 1999

(51) Int. Cl.$^7$ .................................................. G01C 21/00
(52) U.S. Cl. .................................................. 73/178 R
(58) Field of Search .................. 73/178 R, 179, 73/180, 181, 182, 861.42, 861.65, 861.66, 861.67; 244/181, 45 A; 137/15.2

(56) References Cited

U.S. PATENT DOCUMENTS

| | | | |
|---|---|---|---|
| 2,204,367 | 6/1940 | Kollsman | 73/212 |
| 3,163,040 | 12/1964 | Werner | 73/212 |
| 3,318,146 | 5/1967 | De Leo et al. | 73/180 |
| 3,482,445 | 12/1969 | De Leo et al. | 73/182 |
| 4,025,008 | * 5/1977 | Peikert | 137/15.2 |
| 4,096,744 | 6/1978 | De Leo et al. | 73/180 |
| 4,277,940 | * 7/1981 | Harner | 60/245 |
| 4,378,696 | 4/1983 | De Leo et al. | 73/180 |
| 4,378,697 | 4/1983 | De Leo et al. | 73/182 |
| 4,615,213 | 10/1986 | Hagan | 73/180 |
| 4,645,517 | 2/1987 | Hagen et al. | 55/182 |
| 4,718,273 | 1/1988 | McCormack | 73/180 |
| 4,836,019 | 6/1989 | Hagen et al. | 73/180 |
| 5,025,661 | 6/1991 | McCormack | 73/180 |
| 5,083,279 | * 1/1992 | Burdoin | 244/181 |
| 5,205,169 | 4/1993 | Hagen | 73/180 |

OTHER PUBLICATIONS

Brochure 1044: "Angle of Attack Systems", BFGoodrich Aerospace, Rev. Apr. 1995.
Brochure: "Upgrade and Save; Reduce DC–9–30/–40/–50 Angle of Attack Sensor Costs By Up to 75% ", BFGoodrich Aerospace, published Sep. 1995.
Brochure: "BFGoodrich Aircraft Sensors Model 0861CAL Angle of Attack Sensor", BFGoodrich Aerospace, published 1998, no month.
Brochure: "BFGoodrich Aircraft Sensors Model 0861HD Angle of Attack Sensor", BFGoodrich Aerospace, published Dec. 1998.

* cited by examiner

Primary Examiner—William Oen
(74) Attorney, Agent, or Firm—Westman, Champlin & Kelly, P.A.

(57) ABSTRACT

A method of and apparatus for obtaining angle of attack, local static pressure and local pitot pressure from measured pressure values at ports of a probe having angle measuring ports with angle measuring axes lying in a plane and a pitot port having an axis lying along an axis in the plane bisecting the angle between the measuring ports. A table of known values of angle of attack relative to measured pressure ratio at measured Mach numbers determined by $P_1/P_m$ is stored in memory and used when $P_1$ is greater than the pressure sensed at the pitot port ($P_{t_m}$), $P_1$ is the pressure measured at the one of the angle measuring ports that is higher than the pressure measured at the other angle measuring port, and $P_m$ is an average of the pressures at the angle measuring ports. The correlation of the ratio of measured pressures on the probe relative to angle of attack is determined using the known values $P_1/P_m$ at different angles of attack either in wind tunnel tests or by computer simulation. The known values are stored in a look-up table in an onboard air data computer. The values that have been stored then can be retrieved to solve for the correct angle of attack, using the measured pressures $P_1$, $P_2$ and $P_{t_m}$. The angle of attack values are used with an algorithm to determine local pitot and static pressure.

14 Claims, 5 Drawing Sheets

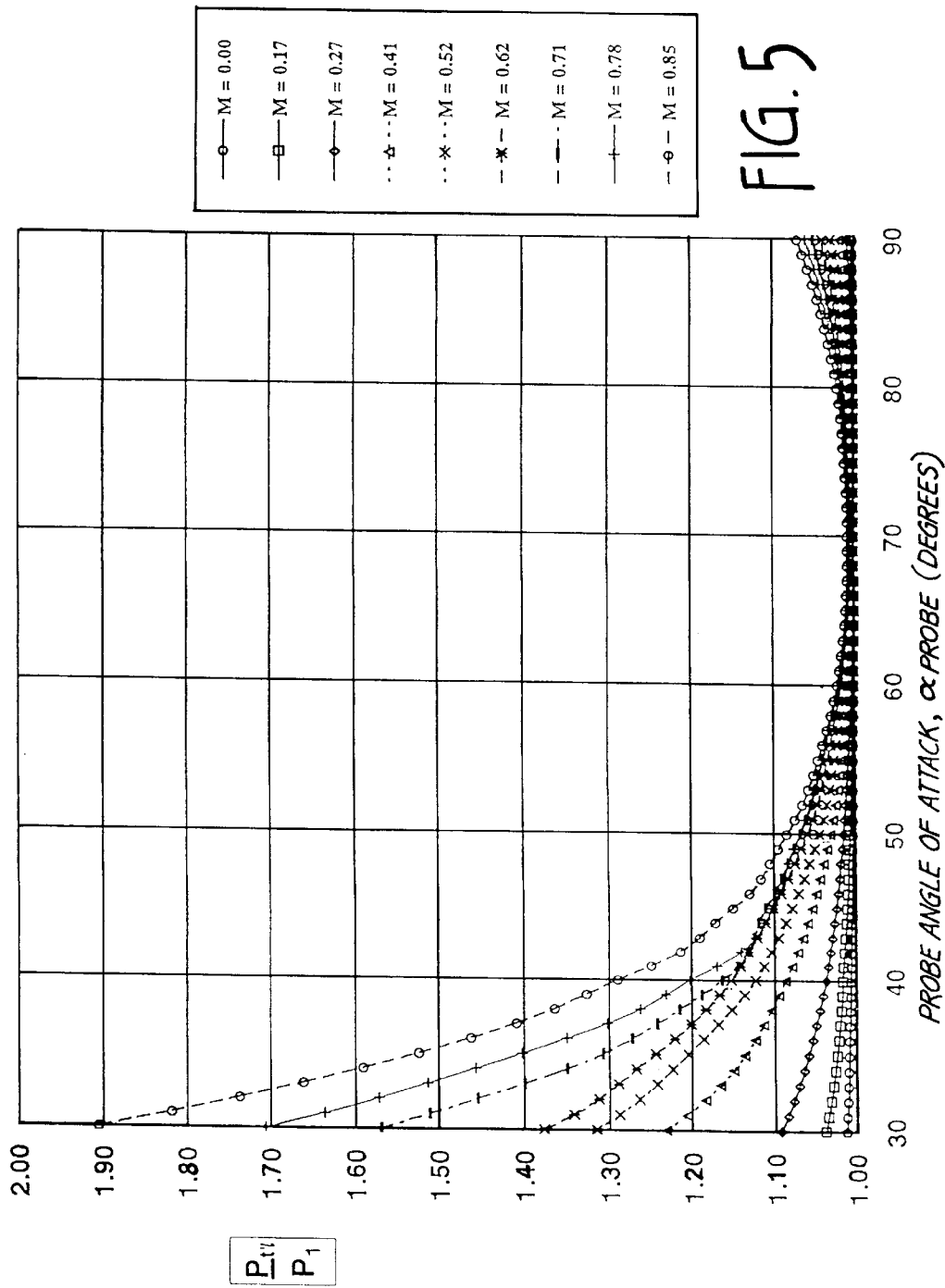

METHOD OF AND APPARATUS FOR USING AN ALTERNATE PRESSURE TO MEASURE MACH NUMBER AT HIGH PROBE ANGLES OF ATTACK

BACKGROUND OF THE INVENTION

The present invention relates to a method of utilizing measured pressures from pressure sensing ports on an air vehicle for obtaining accurate indications of static pressure, pitot pressure, and angle of attack at very high angles of attack encountered in high performance air vehicles.

In the past, the problems of obtaining accurate measurements from air data sensors or probes during very high angles of attack have been recognized, and different approaches have been used for obtaining correction factors. For example, U.S. Pat. No. 5,205,169 provides for inverting the ratio of pressure differentials from sensing ports at high angles of attack, generally above 450°. In U.S. Pat. No. 5,205,169 the normal angle of attack ratio $(P_1-P_2)/q_{cm}$ is inverted to be $q_{cm}/(P_1-P_2)$ when the denominator $q_{cm}$ approaches zero.

Other methods have been used, such as an iterative calculation of measured pressures which requires substantial computer capacity for carrying out accurate analysis of the measured pressures.

SUMMARY OF THE INVENTION

The present invention relates to a method for correcting measured pressures at high angles of attack, by determining Mach number using an alternate pressure signal and providing in the computation, derived correction factors from a calibrated "look-up" table in an air data computer. The calibration data or factors are either directly obtained from wind tunnel tests of the sensor probe configuration in actual operational use, or from computer simulations of such sensors at various Mach numbers and angles of attack.

The calibration values are used in a conventional manner for determining accurate angle of attack, static pressure, and pitot pressure from the measured pressures. The pressures that are measured at the ports are correctable up to angles of attack of in the range of 650°.

The alternate pressure signal is obtained from an angle of attack measuring port located on the sensing probe at a location where pressure increases as angle of attack increases, and the measured alternate pressure is used when the pressure from one angle sensing port of an angle of attack sensor is larger than the measured pitot pressure. The conventional local flow calibration approach is used when the pressure of the angle measuring ports is smaller than the measured pitot pressure.

The method of the present invention is applicable at angles of attack of between about 30° and 65°. Different shaping of the probe could extend the use of the present invention at angles up to about 90°.

The calibration values are provided for measured pressures indicating Mach numbers at angles of attack above about 35°. The calibration values can be easily placed in memory of an onboard computer to derive accurate readings of angle of attack, static pressure, and pitot pressure from the measure pressures.

The method is used in general with a cylindrical probe having angle sensing ports on the top and bottom of the probe, but it also is useful for flush mounted probes having angle of attack sensing ports that are sensitive to a change in angle of attack, in conjunction with a forward facing (pitot) pressure sensing port.

BRIEF DESCRIPTION OF THE DRAWINGS

FIG. 5 is a graph of corrected plots of a pressure quantity $P_{tl}/P_1$ for use in obtaining pitot pressure plotted versus angle of attack and stored in a look-up table (these calibration values are used to determine total pressure).

DETAILED DESCRIPTION OF THE PREFERRED EMBODIMENTS

Figure 1:
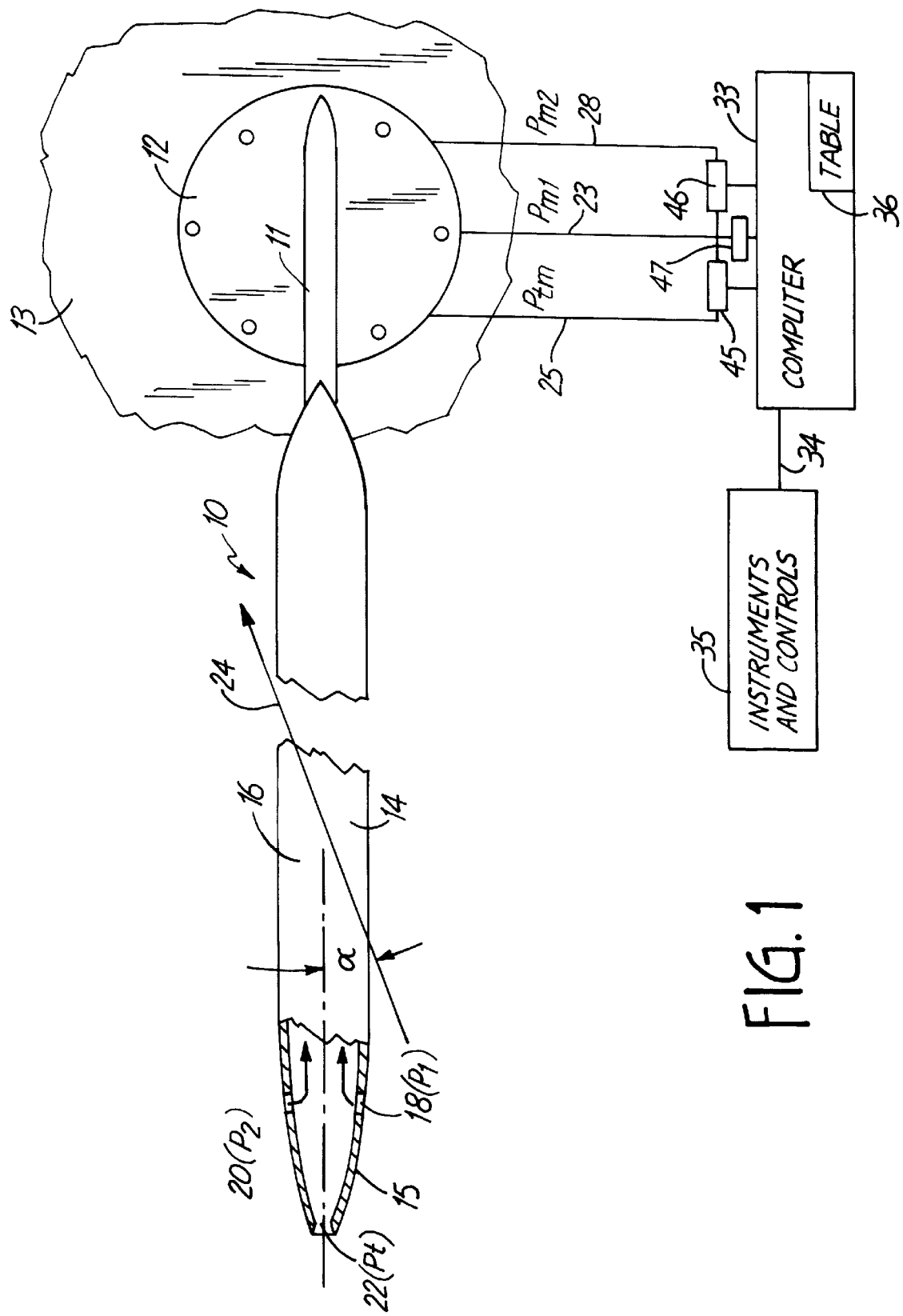
FIG. 1 is a schematic representation of a typical sensor in the form of a probe used on an aircraft, having sensing ports and instrumentation that can be used with the methods of the present invention.

A strut mounted air data sensing probe illustrated generally at 10 is used to obtain pressure measurements for determining angle of attack pitot pressure and from the sensed pressure. A support strut 11 is attached to a mounting base 12, that is generally fastened onto the fuselage 13 of an aircraft or air vehicle. Probe 10 includes a probe barrel 14 that has a longitudinal axis 16 that is oriented in a selected relationship with respect to a reference axis of the fuselage 13 of the aircraft. A forward tapered end 15 is provided with top and bottom angle of attack pressure ports shown at 18 and 20 and a pitot port 22 which is shown at the leading end of the probe barrel and has a center axis coincidental with the barrel axis 16. The barrel axis is a center line between the ports 18 and 20.

The pressure ports 18 and 20 are used for determining the angle of attack or angle of local flow relative to the reference line which coincides with axis 16 which is a reference axis or line of the air vehicle or aircraft. When flow direction is represented at line 24, angle of attack is indicated as oa in FIGS. 1 and 2.

At low angles of attack or at low angles a, the standard equation for calculating the angle of attack works well. These compensation techniques are disclosed, for example, in U.S. Pat. No. 4,096,744 as well as U.S. Pat. No. 5,205,169. In determining angles of attack for positive angles, the bottom pressure port 18 is considered to have a pressure $P_1$ provided along a pressure carrying line 23 and the upper or top pressure port 20 that is sensitive to angle of attack is considered to have a pressure $P_2$ provided along pressure carrying line 28.

The pitot pressure is $P_t$ and provided along a pressure carrying line 25. Additional designations are used with $P_t$ to indicate whether it is measured pressure ($P_{tm}$) or local ($P_{tl}$) pressure. The pressures are provided to suitable pressure sensors 45, 46 and 47 that provide electrical signals to an air data computer 33. The air data computer then provides corrected outputs along lines 34 to instrument displays and controls shown generally at 35, that display measured parameters such as angle of attack, Mach numbers, altitude and the like. The computer outputs can be used in fly by wire aircraft controls.

In a flush mounted sensor the angle sensing ports would have an axis in a plane in which an angle of attack is to be measured. As angle of attack in the plane changes, the ports would sense different pressures, to determine angle.

The basic equation for determining angle of attack is $(P_1-P_2)/q_{cm}$. $P_1$ is pressure measured by the lower angle of attack pressure port 18, and $P_2$ is the pressure measured by the upper angle of attack pressure port 20 when positive angles of attack are measured. $q_{cm}$ is the impact pressure, which is the measured pitot pressure $P_{t'm}$ minus the static pressure $(P_{t'm}-P_m)$. $P_m$ is $(P_1+P_2)/2$. The equation $(P_m-P_l)/q_{cl}$, provides local static pressure $P_l$. The static pressure ratio for $P_1$ is equal to $(P_1-P_l)/q_{cl}$. Finally, the static pressure ratio for $P_2$, the upper port, is $(P_2-P_l)/q_{cl}$.

In these ratios, the quantities are defined as follows:
Where $P_1$=Static pressure measured by the lower static pressure port $P_2$=Static pressure measured by the upper static pressure port $P_{t'm}$=Probe measured pitot pressure $P_m=(P_1+P_2)/2$ derived measured static pressure $q_{cm}=(P_{t'm}-P_m)$ $P_l$=Local static pressure $P_{t'l}$=Local pitot pressure $q_{cl}=(P_{t'l}-P_l)$ $M_l$=Local Mach number $\alpha_{probe}$=Probe or sensor angle of attack Studies show that at high positive angles of attack using measured pitot pressure $(P_{t'm})$ in the pitot error relationship $(P_x-P_{t'l})/q_{cl}$, results in greater error in the measured angle of attack than when $P_1$ is used as $P_x$.

In U.S. Pat. No. 5,205,169, where the ratio of pressure differentials was inverted when angle of attack was greater than approximately a 45° angle of attack with the type of probe shown in U.S. Pat. No. 5,205,169, there still was a need for providing substantial mathematical correction. The prior art system shown in U.S. Pat. No. 5,205,169 used the measured pitot pressure divided by the average of the pressures at the angle measuring ports, or $P_{t'm}/[(P_1+P_2)/2]$ for measured Mach number.

Figure 2:
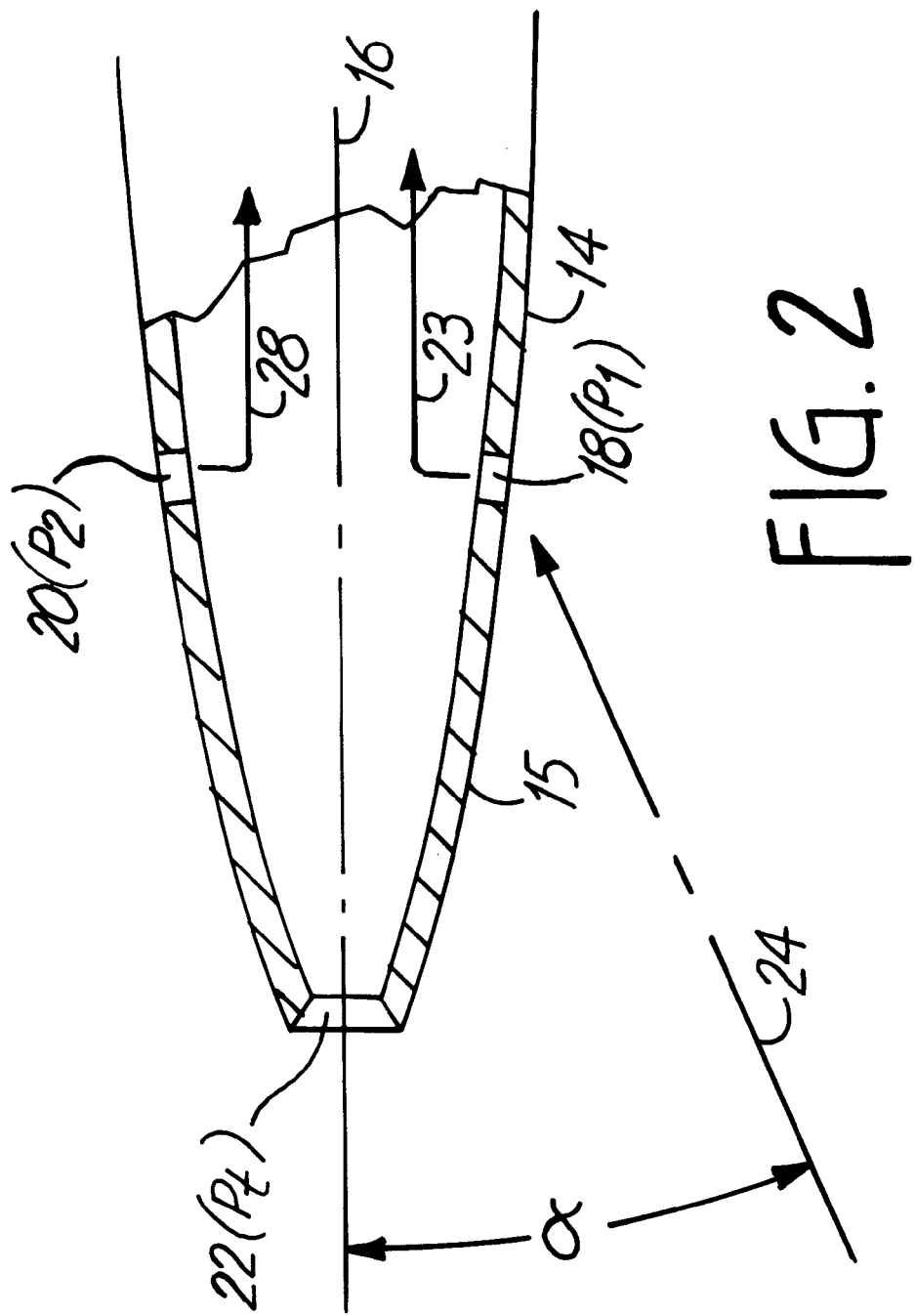
FIG. 2 is a fragmentary enlarged longitudinal sectional view of a forward end of the probe of FIG. 1.

It has been discovered that using the pressures measured from the ports arranged as shown in FIG. 1, it is possible to obtain accurate angle of attack, local static pressure and corrected local pitot pressure simply. The mathematics that are necessary for correction are substantially reduced, and high accuracy is achieved by substituting the sensed pressure $P_1$ at the lower port (for positive angles of attack) for $P_t$, (the pitot pressure) and dividing $P_1$ by the measured static pressure $(P_m=(P_1+P_2)/2)$ to determine measured Mach number for calibration information stored in an onboard computer after probe calibration in the wind tunnel.

Summarized below is the method of the present invention for correcting measured pressures at high angles of attack:

When $P_1<P_{t'm}$ use the prior art local flow calibration approach, where the ratio $P_{tm}/P_1$ was used for obtaining measured Mach number.

When $P_1>P_{t'm}$ use the following calibration approach:

Define $\alpha_{probe}$ by $\alpha probe=f\ (P_1/P_m), (P_1-P_{t'm})/(P_1-P_m)\}$ Define $P_l$ by $(P_l/P_m)=f\ \{\alpha_{probe}, (P_1/P_m)\ \}$ Define $P_{t'l}/P_m$ by $(P_{t'l}/P_1)=f\{\alpha_{probe}, (P_1/P_m)\}$ The present method uses measured pressures to determine Mach number and convert directly to corrected local pitot pressure, local static pressure and probe angle of attack. A key feature of the method is the interchanging of $P_1$ and $P_{t'm}$ (measured pitot pressure) at high angles of attack to determine the local pitot pressure, $P_{t'l}$ and static pressure. All the calibration values for the present invention are determined using available probe calibration data from wind tunnel tests, but using $P_1$ instead of $P_{t'm}$ for the Mach number for correlating the calibration data. A parallel path using this method can be developed to convert from specific measured probe pressures to true values of P (static pressure) and $P_t$ (pitot pressure) and aircraft angle of attack. This case requires knowing the flow field on the aircraft at the probe mounting location. Extension of the method to solve for true conditions is straight forward.

Figure 3:
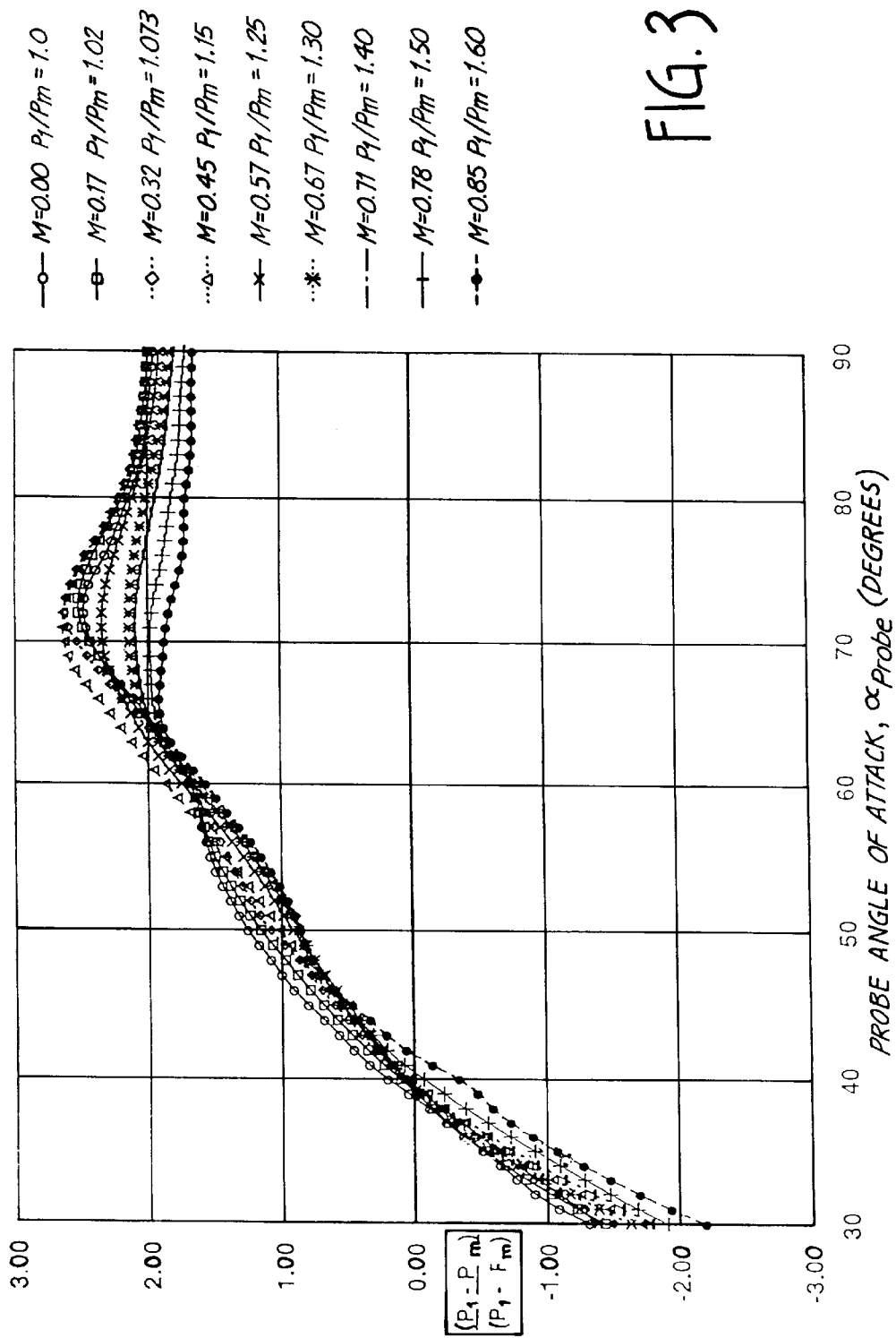
FIG. 3 is a graphic representation of information stored in a look-up table from actual tests including factor $P_1/P_m$ for different Mach numbers plotted as a pressure quantity versus probe angle of attack above 30° where $P_1$ is the higher pressure at the angle sensing ports (these calibration values are used to determine angle of attack)
Figure 4:
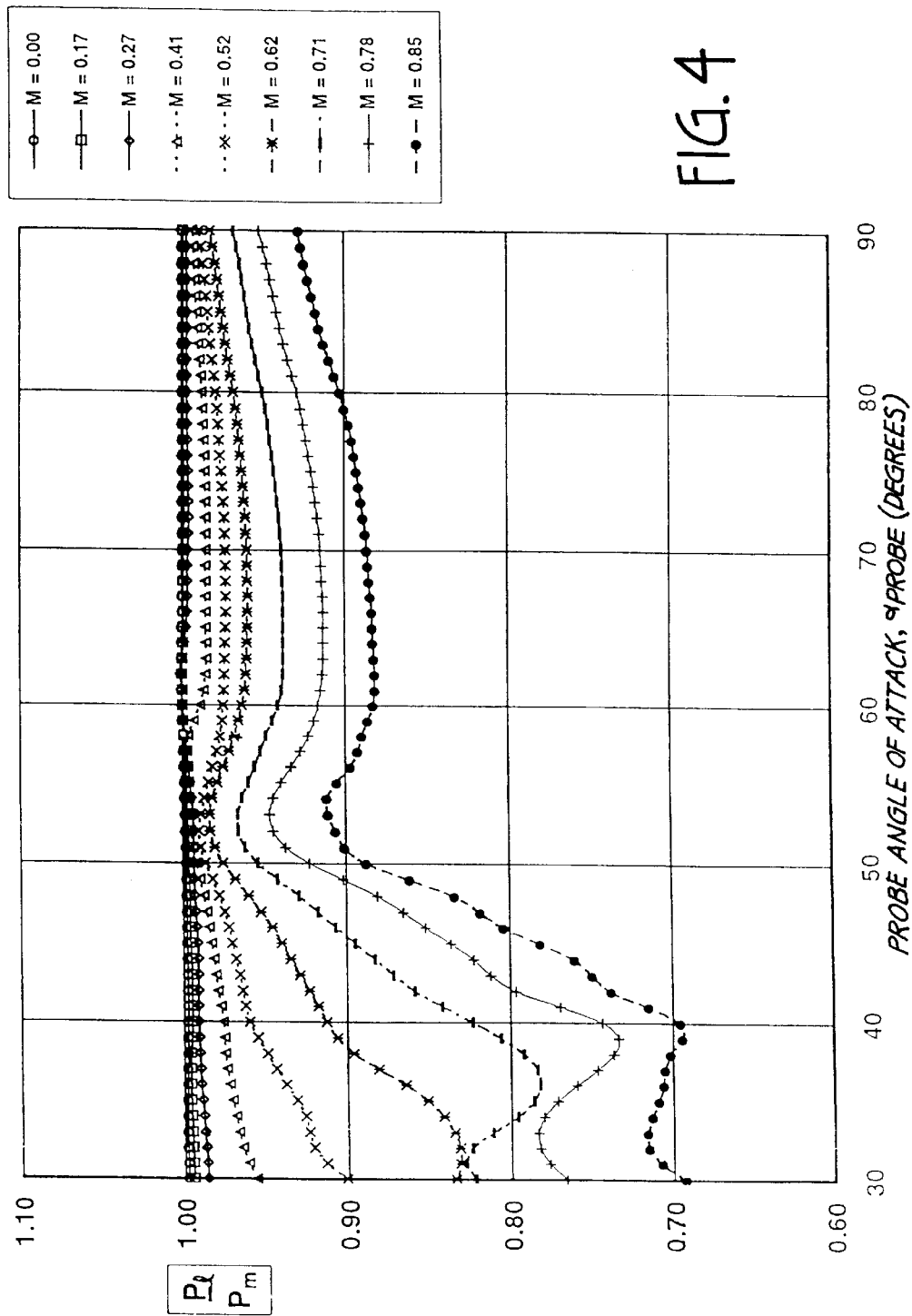
FIG. 4 is a graph of corrected plots of a pressure quantity $P_l/P_m$ versus angle of attack of a probe and stored in a look-up table (these calibration values are used to determine static pressure)

| | |
|---|---|
| FIG. 3 (Angle of Attack Signal) | $(P_1-P_{t'm})/(P_1-P_m)$ for lines of constant $(P_1/P_m)$ as a function of sensor angle of attack. |
| FIG. 4 (Static Pressure Calibration) | $(P_l/P_m)$ for lines of constant sensor angle of attack as a function of $(P_1/P_m)$. |
| FIG. 5 (Pitot Pressure Calibration) | $(P_{t'l}/P_1)$ for lines of constant sensor angle of attack as a function of $(P_1/P_m)$. |

Example calibration values for obtaining angle of attack when the pressure ratio on the vertical scale is sensed and calculated from measured pressures are shown in FIG. 3. The signal shows uniform variations with increasing probe angles of attack to about 70° at lower Mach numbers as determined by $P_1/P_m$. A range up to a probe angle of about 64° shows the best accuracy at higher Mach numbers. Reduced sensitivity of the angle of attack signal occurs at the highest Mach numbers. Static pressure and pitot pressure calibration curves in FIG. 4 and 5 show smooth uniform variations with angle of attack and $P_1/P_m$. It is recognized the use of different probe shapes or additional multiple ports could benefit this signal.

Again, the data in FIGS. 3, 4 and 5 are from ports on a strut mounted probe, but the ports could be flush ports on the nose or side of an air vehicle, rocket or the like.

In FIG. 3, the results of wind tunnel tests that place the probe at different angles of attack, which can be measured, and at different known Mach numbers are plotted for constant measured values of $P_1/P_m$ on the test probe or sensor. $P_1/P_m$ as measured and determined in flight provides measured Mach number. FIG. 3 is for angles of 30° through 90°, which are considered high angles of attack and using $P_1/P_m$ for Mach number rather than $P_{t'm}/P_m$. The measured values of $P_1/P_m$ for the listed Mach numbers are also shown in FIG. 3. By measuring the pressures $(P_1, P_2$ and $P_{t'm})$ and calculating the ratio shown on the Y axis in FIG. 3, namely $(P_1-P_{t'm})/(P_1-P_m)$, the angle of attack value can be directly obtained using an air data computer to interpolate the signal. This gives a value for the ratio using measured pressures, while measured $P_1/P_m$ give the measured Mach number. The look-up table 36 (FIG. 1) having the correct angle of attack correlated to the Y axis ratio of measure pressures at measured Mach number $(P_1/P_m)$ is stored in onboard computer 33, so the correct angle of attack is obtained. For example, at measured Mach 0.45, (as determined by using $P_1/P_m$) if the value of the ratio $(P_1-P_{t'm})/(P_1-P_m)$ using measured pressures is 2, the angle of attack would be slightly over 60°. The accuracy is achieved by providing the $P_1/P_m$ ratio, which at Mach 0.45 is 1.15, since $P_1$ becomes a stronger signal as the $P_{t'm}$ signal decreases when angle of attack increases. In the prior art, and at lower angles of attack, the value used for measured Mach number is $P_{t'm}/P_m$. Additional iterative calculations are necessary and a calculation based on those measured pressures is not as accurate or as direct as the disclosed method when $P_1 > P_{t'm}$.

Once the angle of attack of the probe has been determined, the corrected static pressure, which can be called $P_l$ (local static pressure), or true static pressure, is obtained from the results of wind tunnel tests illustrated in FIG. 4.

The predetermined relationships are in the look-up table 36 in the memory of the onboard computer 33. The values in the table 36 are shown in the graph of FIG. 4. The probe angle of attack, $\alpha_{probe}$, is plotted against the values of the ratio $P_l/P_m$ obtained by calibration in the wind tunnel or by computer simulation and stored in the look-up table.

When the angle of attack has been determined, $P_m$ can be obtained by the quantity $(P_1+P_2)/2$ and the local static pressure $P_l$ can be easily solved in the onboard air data computer 33 using look-up table values.

To determine the true pitot pressure, as shown in FIG. 5, a plot of probe angle of attack, $\alpha_{probe}$, versus the quantity $P_{t'l}/P_1$ as corrected is used. This is done for several different Mach numbers in a wind tunnel or by computer simulation, as indicated. The Mach number graph plots are represented using the same angle of attack determined from FIG. 3 data. The angles of attack shown in FIG. 5 are between 30° and 90°, and the plotted values obtained from wind tunnel tests or simulation are stored in a look-up 36 table in the air data computer so that the particular pressure on the vertical axis can be determined by knowing the angle of attack, which in turn is determined as previously disclosed.

With a measured $P_1$ pressure, and a known angle of attack, the local pitot pressure $P_{t'l}$ can be easily derived or solved. It will equal the value on the vertical axis for a particular angle of attack, times $P_1$. This also can be considered to be the true pitot pressure. The look-up tables provide the information that is necessary for obtaining true pitot pressure, true or local static pressure, and angle of attack. The pressures used can be directly measured by the three ports on the probe shown in FIGS. 1 and 2.

Accuracy, ease of operation, and a reduction in the amount of calculations that are necessary to obtain correct parameters is achieved using the method of the present invention.

The measured Mach number is determined by directly measuring $P_1$ and $P_2$ and arriving at the ratio $P_1/P_m$, when $P_1 > P_{t'm}$ which in turn is correlated to angle of attack as shown in FIG. 3. Determining measured Mach number by providing directly measured pressures $P_1/P_m$ as opposed to the previously used $P_t$, $/P_m$, enhances operations, and does not require the inverted ratio to be used. It also can be seen that the measurements are more direct, and more easily obtained.

The present invention reduces the instability of prior art algorithms used at high angles of attack, generally at probe angles above about 35°. It can be seen that the angle of attack curves that are developed and correlated to the quantity $P_1/P_m$ do not have instability across the range of operation between 30° and 90° probe angle of attack. Further, direct pressure measurements are used with the present invention, as opposed to the iterative correction process necessary for mathematical calculations of the local pressures or angle of attack using conventional methods.

It should be noted that the term port used for the angle sensing ports means not only a single opening, but also two or more openings on the bottom or top of the probe or sensor that are plumbed together and provide a signal which indicates a pressure changing with angle of attack.

Although the present invention has been described with reference to preferred embodiments, workers skilled in the art will recognize that changes may be made in form and detail without departing from the spirit and scope of the invention.

What is claimed is:

1. The method of providing angle of attack of an object using a pressure ratio obtainable from air data sensing ports on the object providing pressures $P_1$ and $P_2$ which vary from each other at changing angles of attack and also providing a pitot pressure $P_{t'm}$, comprising providing predetermined values of angle of attack for values of the pressure ratio at Mach numbers related to measured $P_1/P_m$, where $P_1$ is the higher of the pressures $P_1$ and $P_2$, and $P_m$ is the average of pressures $P_1$ and $P_2$, and using the predetermined values to obtain angle of attack from measured pressure values forming the pressure ratio, when $P_1$ is greater than $P_{t'm}$.

2. The method of claim 1, wherein the pressure ratio comprises $(P_1-P_{t'm})/(P_1-P_m)$.

3. A method of using measured pressure signals from an air data sensor to provide accurate corrected pressure parameters wherein the air data sensor has a pair of angle sensing ports with sensing axes positioned in a plane, and indicating an angle of a center reference line relative to a flow direction line past the sensor to provide angle of attack, and having a pitot port having an axis lying along the center reference line, and wherein pressures sensed at the respective angle sensing ports differ when the reference line is at an angle relative to the flow direction line with a higher of the pressures at the angle sensing ports being designated $P_1$, a pressure at the other of the angle sensing ports being designated $P_2$, and a pressure at the pitot port being designated $P_{t'm}$, comprising measuring $P_1$, adding $P_1$ to $P_2$ and dividing by 2 to obtain a quantity $P_m$, and dividing $P_1$ by $P_m$ to obtain measured Mach number when $P_1$ is greater than $P_{t'm}$.

4. The method of claim 3 further comprising providing known values of angle of attack for the air data sensor plotted against the numerical value of a first ratio, $(P_1-P_{t'm})/(P_1-P_m)$ and at selected measured Mach numbers determined by $P_1/P_m$, and providing a first look-up table for determining angle of attack when said first ratio and $P_1/P_m$ has been determined from measured pressures at the probe ports.

5. The method of claim 4 and providing a stored second look-up table of predetermined values of $P_l/P_m$ plotted against angle of attack, where $P_l$ is the local static pressure, and determining local static pressure at the sensor by correlating measured $P_1$ relative to angle of attack in accordance with values determined from the stored second look-up table.

6. The method of claim 4 further comprising storing predetermined values of $P_{t'l}/P_1$ plotted versus angle of attack in a look-up table, wherein $P_{t'l}$ comprises the true pitot pressure, and obtaining a true pitot pressure value by measuring the value of $P_1$ and correlating $P_{t'l}/P_1$ to angle of attack as determined from stored values in the first look-up table.

7. A method of determining angle of attack of an air vehicle from measured pressure signals sensed by a pair of angle sensing ports on the vehicle with axes lying in a common plane, with a reference line in the common plane, and indicating an angle of the reference line relative to a flow direction line in the plane, and from measured pressures at a pitot pressure sensing port on the air vehicle having an axis lying along the reference line, and wherein the pressures sensed at the angle sensing ports differ when the reference line is at an angle relative to the flow direction line, with a higher pressure at the angle sensing ports being designated $P_1$, a pressure at the other of the angle sensing ports being designated $P_2$, and a pressure at the pitot port being designated $P_{t'm}$, the method comprising obtaining a ratio from signals representing $P_1$, $P_2$ and $P_{t'm}$, by adding $P_1$ to $P_2$ and dividing 2 to obtain a quantity $P_m$, and dividing $P_1$ by $P_m$, only when $P_1$ is greater than $P_{t'm}$ to obtain the ratio, and using the ratio to determine measured Mach numbers.

8. The method of claim 7 further comprising providing a first look-up table establishing measured values of angle of attack plotted against the numerical value of a second ratio $(P_1-P_{t'm})/(P_1-P_m)$ and at selected Mach numbers correlated to a first ratio $P_1/P_m$, and determining angle of attack when said first and second ratios have been determined from measured pressures at the sensing ports.

9. The method of claim 7 and providing a second stored look-up table of predetermined values of $P_l/P_1$ plotted against angle of attack, where $P_l$ is the local corrected static pressure, and determining local static pressure at the air vehicle by correlating measured $P_1$ signals relative to angle of attack in accordance with the values determined from the stored second look-up table.

10. The method of claim 8 further comprising storing predetermined values of $P_{t'l}/P_1$ plotted versus angle of attack, wherein $P_{t'l}$ comprises the true pitot pressure, and obtaining a true pitot pressure value by measuring the value of $P_1$ and correlating $P_1$ to angle of attack determined from stored values of the first stored look-up table.

11. The method of claim 8 including obtaining the required pressure values from sensing ports on a probe.

12. An apparatus for determining angles of attack across a range comprising:

a probe having a probe axis and oppositely facing ports having measuring axes lying in a plane with the probe axis in which an angle of attack is to be measured relative to a flow direction axis also lying in the plane of said measuring axes, one of said ports providing a higher pressure signal than the other when the probe axis is at an angle other than zero with respect to the flow direction axis;

a pitot pressure port on the probe having an axis generally parallel to the probe axis to measure pressures created by relative flow past the probe;

pressure transducers for providing signals indicating pressures at each of the ports; and a processor providing an output $(P_1-P_{t'm})/(P_1-P_m)$ and correlated to calibrated values of angle of attack at measured Mach numbers using the ratio $P_1/P_m$ to determine measured Mach number whenever $P_1$ is greater than $P_{t'm}$, where $P_1$ is the higher of the pressures at the oppositely facing ports, $P_{t'm}$ is the measured pitot pressure at the pitot port, and $P_m$ is the quantity $(P_1+P_2)/2$ where $P_2$ is the pressure measured at the other of the oppositely facing ports.

13. The apparatus of claim 12, wherein the processor includes pressure sensors for providing signals that indicate pressures at the oppositely facing ports and the pitot port.

14. The apparatus of claim 12, wherein the measuring axis of the oppositely facing ports are at equal angles relative to the probe axis.

* * * * *

UNITED STATES PATENT AND TRADEMARK OFFICE
CERTIFICATE OF CORRECTION

PATENT NO. : 6,305,218 B1
DATED : October 23, 2001
INVENTOR(S) : Roger D. Foster It is certified that error appears in the above-identified patent and that said Letters Patent is hereby corrected as shown below:

Column 1,
Line 18, cancel "450º" and insert -- 45º --.
Line 42, cancel "650º" and insert -- 65º --.

Column 3,
Line 57, cancel "$P_{tm}/P_1$" and insert -- $P_{t'm}/P_1$ --
Cancel line 60 and insert a new line 60 as follows:
-- Define $\alpha_{probe} = f\{ (P_1/P_m), (P_1 - P_{t'm})/(P_1 - P_m) \}$ --

Column 5,
Line 7, cancel "$P_1$" and insert -- $P_\ell$ --.
Line 49, cancel "$P_{t'}/P_{m'}$" and insert -- $P_{t'm}/P_{m'}$ --.

Column 7,
Line 7, after "dividing" (first occurrence) insert -- by --.

Column 8,
Line 29, cancel "axis" and insert -- axes --.

Signed and Sealed this

Twenty-ninth Day of October, 2002

Attest:

JAMES E. ROGAN
Attesting Officer          Director of the United States Patent and Trademark Office